United States Patent [19]

Shiga

[11] Patent Number: 5,027,080

[45] Date of Patent: Jun. 25, 1991

[54] SOURCE FOLLOWER LIGHT RECEPTION CIRCUIT

[75] Inventor: Nobuo Shiga, Yokohama, Japan

[73] Assignee: Sumitomo Electric Industries, Ltd., Osaka, Japan

[21] Appl. No.: 544,510

[22] Filed: Jun. 27, 1990

[30] Foreign Application Priority Data

Jul. 6, 1989 [JP] Japan ................................. 1-174976

[51] Int. Cl.$^5$ ..................... H04B 10/06; H03F 3/08; H03F 3/193
[52] U.S. Cl. ................... 330/59; 250/214 A; 330/277; 330/308; 455/619
[58] Field of Search ............... 324/347, 349, 351, 369; 455/619; 250/214 A; 330/59, 277, 308

[56] References Cited

U.S. PATENT DOCUMENTS 4,688,267 8/1987 Chown et al. ..................... 455/619
4,750,217 6/1988 Smith et al. ......................... 455/619

OTHER PUBLICATIONS

Van Tuyl, "A Monolithic Integrated 4-GHz Amplifier", 1978, IEEE International Solid-State Circuits Conference, San Francisco, Calif., Feb. 15-17, 1978.

*Primary Examiner*—Siegfried H. Grimm
*Attorney, Agent, or Firm*—Stevens, Davis, Miller & Mosher

[57] ABSTRACT

In analog communication, a transmission signal must be demodulated with good linearity. However, linearity of a reception signal is often impaired due to a too large input signal or variations during the manufacture of elements or a fluctuation in power supply voltage. According to this invention, a plurality of source-follower circuits constituting a demodulation circuit are formed on a single semiconductor substrate, a resistor having a high resistance is connected between the gate and the source of a first FET, and another resistor is connected to the source. The gate of each of the second and subsequent FETs is connected to the source of the immediately preceding FET, and its source is connected to the gate of the next FET. A product of a gate width of each of the second and subsequent FETs and a resistance of the resistor connected to the source is set to be equal to that of the first FET. An operation gate voltage of each FET is set to fall within a range wherein the relationship between the operation gate voltage and a drain current linearly changes. Since the FETs are formed on the single substrate, rates of variations during the manufacture of the elements and a fluctuation in power supply voltage become equal to each other. Therefore, according to this invention, a reception signal can be demodulated with excellent linearity.

13 Claims, 10 Drawing Sheets

SOURCE FOLLOWER LIGHT RECEPTION CIRCUIT

BACKGROUND OF THE INVENTION

1. Field of the Invention

The present invention relates to a demodulation circuit for demodulating a reception signal.

2. Description of the Related Background Art

As a conventional demodulation circuit of this type, for example, a light reception circuit disclosed in IEEE TRANSACTIONS ON ELECTRON DEVICES, VOL. ED-28, NO. 2, FEBRUARY, 1981 is known, and is shown in FIG. 1.

The drain of a field effect transistor (FET) Q1 is connected to an FET Q2 of which function is a load of the FET Q1, and its source is grounded. An FET Q3, diodes D1 to D4, and an FET Q4 constitute a source-follower circuit, and are formed so that an output impedance of the circuit is 50 Ω. A positive power supply voltage $V_{DD}$ of +5 V is applied to the drains of the FETs Q2 and Q3, and a negative power supply voltage $V_{SS}$ of −4 V is applied to the source of the FET Q4.

A received light signal is converted into an electrical signal, and the electrical signal is supplied to the FET Q1 as a gate voltage $V_{gs}$ to be converted to a drain current $I_d$. The drain current $I_d$ flows to have the FET Q2 as a load, and a voltage is generated at the drain of the FET Q1. Since this voltage is applied to the gate of the FET Q3, the FET Q3 is turned on, and a drain current $I_d$ also flows through the diodes D1 to D4, and a predetermined voltage is generated at the drain of the FET Q4. Thus, this predetermined voltage is output.

In the conventional circuit shown in FIG. 1, however, when a strong light signal is received, the amplitude of a signal input to the circuit is increased. For this reason, distortion of a signal to be demodulated is increased, and linearity of a demodulated signal is impaired. This poses a serious problem in a system which is required to demodulate an analog signal as a reception signal with excellent linearity.

A cause of impairing linearity is as follows. That is, in gate voltage $V_{gs}$ vs. drain current $I_d$ characteristics as I/O characteristics of an FET, the drain current $I_d$ is expressed as a quadratic function of the gate voltage $V_{gs}$, and is given by the following equation:

$$I_d = K(V_{gs} - V_{th})^2 \quad (1)$$

where $V_{th}$ is the threshold voltage of the FET, and K is the proportional constant serving as a reference for a current driving capacity.

Therefore, when the reception signal applied to the FET as the gate voltage $V_{gs}$ is increased, the drain current $I_d$ is nonlinearly changed, and linearity of a demodulated signal is impaired.

A light reception circuit shown in FIG. 2 is also known.

A voltage $V_B$ is applied to a light-receiving element 1. A light signal received by the light-receiving element 1 is converted to a voltage signal by a resistor R1. A DC component of this voltage signal is removed by a capacitor C1, and the voltage signal is applied to the gate of an FET Q5. A predetermined voltage is applied to the gate of the FET Q5 by resistors R2 and R3. The voltage signal from which the DC component is removed is impedance-converted by a source-follower circuit constituted by the FET Q5 and a resistor R4. The impedance-converted voltage signal is output from the source of the FET Q5.

In the conventional circuit shown in FIG. 2, when the resistors R2 and R3 are appropriately selected, the gate voltage of the FET Q5 can be desirably selected. However, the gate voltage fluctuates due to manufacturing variations of, e.g., a threshold voltage, a transfer conductance $g_m$, and the like of the FET Q5, and a fluctuation in power supply voltage $V_{DD}$. Therefore, a demodulated signal cannot be stabilized, and linearity is impaired.

SUMMARY OF THE INVENTION

It is an object of the present invention to provide a demodulation circuit for demodulating a recpection signal with excellent linearity.

In order to achieve the above object, according to the present invention, a plurality of source-follower circuits for impedance-converting a reception signal are formed on a single semiconductor substrate. A reception signal is applied to the gate of a first FET, a resistor having a high resistance is connected between the gate and the source of the first FET, and another resistor is connected to the source. The gate of each of second and subsequent FETs is connected to the source of the previous FET, and its source is connected to the gate of the next FET and to a resistor. A product of a gate width of each of the second and subsequent FETs and a resistance of the resistor connected to its source is set to be equal to a product of the gate width of the first FET and a resistance of the resistor connected to its source. In addition, the gate width of the last FET is set so that an output impedance becomes smaller than an impedance of a load circuit.

Therefore, since the resistance of the resistor connected between the gate and the source of the first FET is high, the gate and source potentials of the first FET are almost equal to each other, and its gate-source voltage becomes almost 0 V. Since the products of the gate widths of all the FETs and the resistances of the resistors connected to their sources are equal to each other, the products of drain currents of all the FETs and the resistances connected to their sources are equal to each other, and the source potentials of all the FETs become equal to each other. In addition, the source potential of each FET is equal to the gate potential of the next FET. Therefore, the source and gate potentials of each FET are equal to each other, and the gate-source voltage of each FET becomes almost 0 V.

The source-follower circuit having a high output impedance is connected as a load of each FET. In addition, since the output impedance is smaller than the impedance of the load circuit, the load of the last FET has a high impedance. For this reason, the voltage gain of each FET becomes almost 1, and an amplitude of a signal output from the source of each FET is decreased. Thus, a signal of a small amplitude is applied to the gate of each FET.

As a result, even when a signal having a large amplitude is received, almost no distortion is generated in a signal to be demodulated.

Since these elements are formed on the single semiconductor substrate, variations during manufacturing of these elements occur at the same rate. For this reason, the products of the gate widths of the FETs and the resistances of the resistors connected to their sources are equal to each other among the source-follower circuits regardless of variations during the manufacture of the elements. In addition, the products are not influenced by a fluctuation in power supply voltage. More specifically, distortion of a reception signal can be eliminated without being influenced by variations during the manufacture of elements, a fluctuation in power supply voltage, and the like.

Therefore, according to the present invention, a reception signal can always be demodulated with good linearity. For this reason, the present invention can be particularly effectively applied to a system which is required to demodulate an analog signal with excellent linearity.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
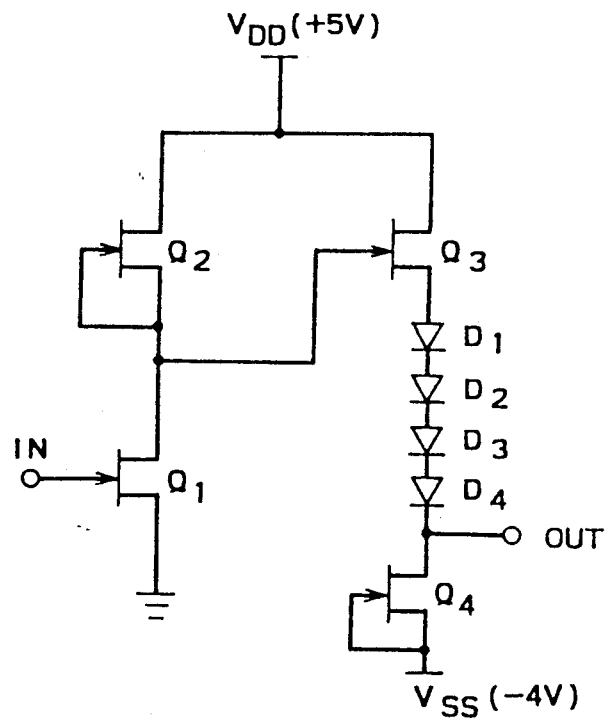
FIG. 1 is a circuit diagram showing a first conventional arrangement.
Figure 2:
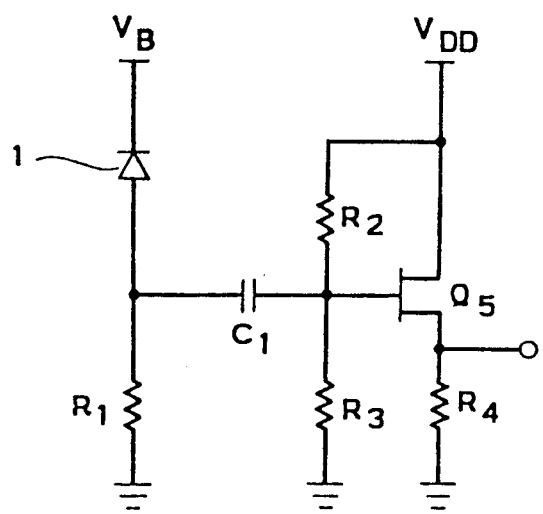
FIG. 2 is a circuit diagram showing a second conventional arrangement.
Figure 3:
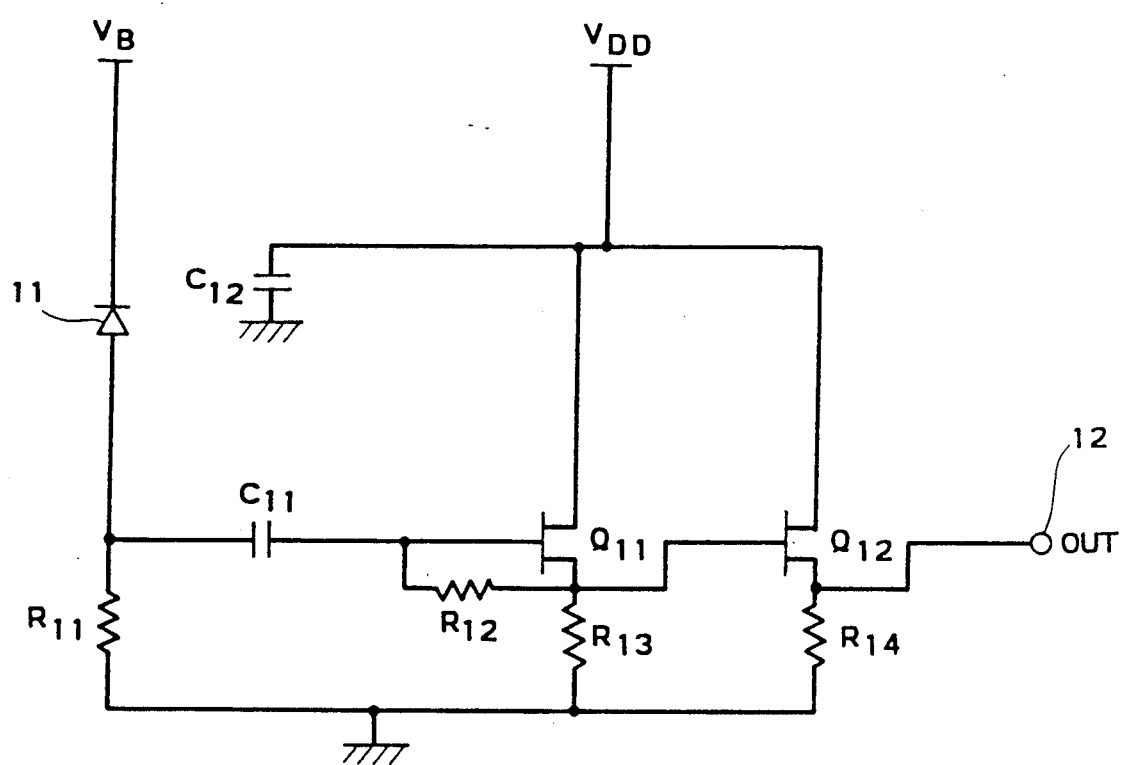
FIG. 3 is a circuit diagram showing an arrangement of an embodiment of the present invention.

A light reception circuit which employs the present invention and is used in an optical CATV system utilized in a high definition television broadcast service is explained. FIG. 3 is a circuit diagram showing an arrangement of an embodiment of the light reception circuit. The circuit is formed on the single semiconductor substrate.

The cathode of a PIN photodiode 11 is pulled up to a power supply voltage $V_B$, and the anode of the PIN photodiode 11 is connected to a resistor R11, one terminal of which is grounded. The anode of the PIN photodiode 11 is connected to the gate of an FET Q11 constituting a first source-follower circuit through a capacitor C11. A resistor R12 having a high resistance is connected between the gate and source of the FET Q11. The drain of the FET Q11 is pulled up to a power supply voltage $V_{DD}$ to which a bypass capacitor C12 is connected. The source of the FET Q11 is grounded through a resistor R13. The source of the FET Q11 is connected to the gate of an FET Q12 constituting a second source-follower circuit. As in the FET Q11, the drain of the FET Q12 is pulled up to the power supply voltage $V_{DD}$, and the source of the FET Q12 is grounded through a resistor R14. The source of the FET Q12 is connected to an output terminal 12 of the circuit.

Figure 4:
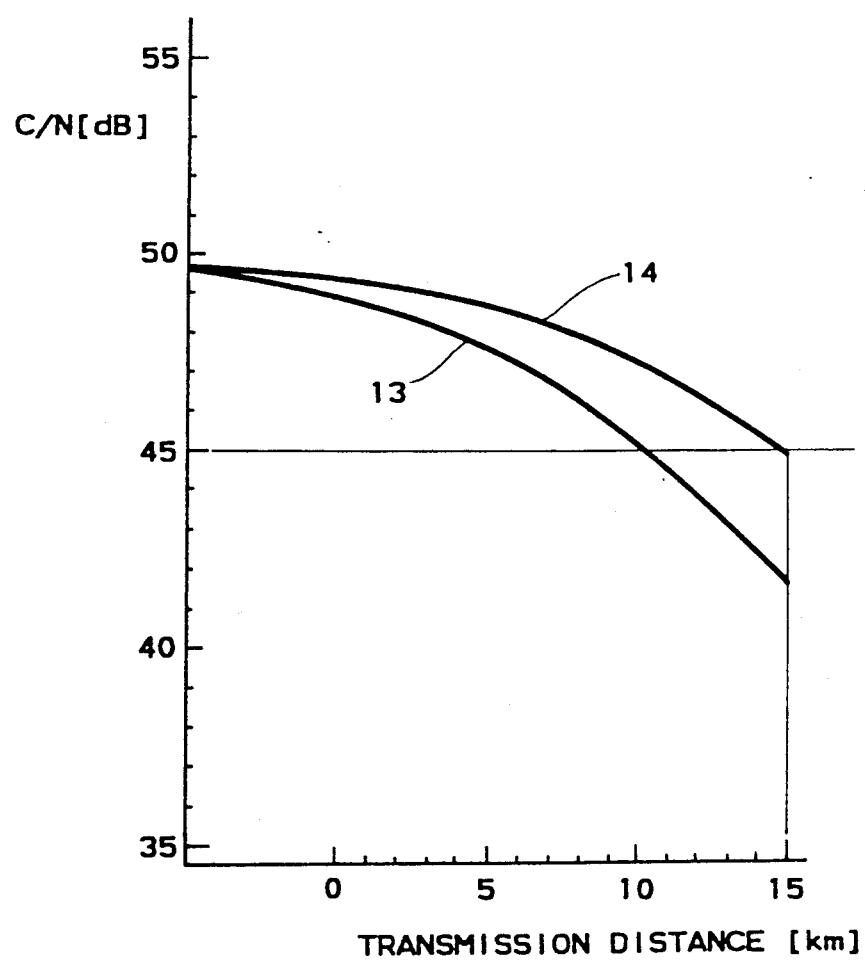
FIG. 4 is a graph showing the relationship between a transmission distance and a C/N ratio when a resistance of a resistor R11 is changed.

A resistance of the resistor R11 is set to be about 1 kΩ to satisfy "desirable performance" defined by the Japanese law relating to cable television broadcast. More specifically, the law requires a C/N ratio (ratio of a carrier signal power to a noise power) of 45 dB or more when an image signal having 40 channels is transmitted by a distance of 10 km. When the resistance of the resistor R11 is changed, the relationship between a transmission distance km (abscissa) and the C/N ratio dB (ordinate) is shown in a graph in FIG. 4. A curve 13 shows the relationship wherein the resistance of the resistor R11 is 300 Ω, and a curve 14 shows the relationship wherein the resistance of the resistor R11 is 1 kΩ. When the resistance is 300 Ω, the C/N ratio is about 45 dB at the transmission distance of 10 km. When the resistance is 1 kΩ, the C/N ratio is about 47 dB at the transmission distance of 10 km, and is about 45 dB at the transmission distance of 15 km. The resistor R11 is therefore required to have a resistance of 1 kΩ or more.

A capacitance of the capacitor C11 is set to be 30 pF or more. The capacitor C11 is a DC cutoff capacitor which prevents a fluctuation in gate voltage of the FET Q11 to keep linearity of a demodulated signal, when a level of a reception signal is high. In an optical CATV system, a low-frequency cutoff frequency is necessary to be 5 MHz or less to transmit an upstream signal from a slave station to a master station at a low frequency band. The capacitor C11 is therefore required to have a capacitance of the above-described value.

A resistance of the resistor R12 may be sufficiently large in comparison with the resistances of the resistors R11 and R13 and set to be 100 kΩ or more, normally. For this reason, little current flows between the gate and source of the FET Q11 so that gate and source potentials are nearly equal to each other. As a result, a gate-source voltage $V_{gs}$ becomes almost 0 V. At an operating point of the FET Q11, the resistance $r_{13}$ of the resistor R13 is set to be a value wherein a drain-source voltage of the FET Q11 is about ½ of a drain breakdown voltage. A resistance $r_{14}$ of the resistor R14 is set to be a value wherein the product of the resistance $r_{14}$ and a gate width $G_{W2}$ of the FET Q12 is equal to the product of the resistance $r_{13}$ of the resistor R13 and a gate width $G_{W1}$ of the FET Q11, that is, to satisfy the following equation:

$$r_{14} = (r_{13} \times G_{W1})/G_{W2} \qquad (2)$$

Since a drain current $I_d$ is in proportion to a gate width, if the resistance $r_{14}$ is set as in equation (2), the source potentials of the FETs Q11 and Q12 are equal to each other. The gate potential of the FET Q12 is equal to the source potential of the FET Q11, and the source potential of the FET Q11 is equal to the gate potential of the FET Q11. Therefore, the gate and source potentials of the FET Q12 are equal to the gate and source potentials of the FET Q11. As a result, a gate-source voltage $V_{gs}$ of the FET Q12 also becomes almost 0 V.

The FET Q12 is a load of the source-follower circuit constituted by the FET Q11, and an input impedance of the FET Q12 is a high impedance. Therefore, a load of the FET Q11 is a high impedance, and a voltage gain A of the FET Q11 becomes almost 1. That is, if a load impedance of the FET Q11 is represented by $R_L$, the voltage gain A in the FET Q11 is given by:

$$A = [g_m(r_{13}//R_L)]/[1 + (r_{13}//R_L)(g_d g_m)] \qquad (3)$$

Where $g_m$ and $g_d$ are a transfer conductance and a drain conductance of the FET Q11, respectively; symbol "//" is a composite resistance when resistors before and after the symbol are connected in parallel. In general, a value of A is less than 1 (A<1). As can be understood from the above equation, if the value $(r_{13}//R_L)$ becomes large, that is, if the value of the load impedance $R_L$ of the FET Q11 becomes large, the voltage gain A becomes nearly 1. In this embodiment, the impedance $R_L$ is sufficiently high because the impedance $R_L$ is the input impedance of the FET Q12, so that the voltage gain A of the FET Q11 becomes almost 1.

The gate width $G_{W2}$ of the FET Q12 constituting the last source-follower circuit is set to satisfy the above equation (2). The gate width is set so that an impedance of the FET Q12 is smaller than that of a load circuit connected to the output terminal 12. In general, in an optical CATV system, an amplifier having an input-/output impedance of 50 to 75 Ω, and such an amplifier may be connected to the load of this circuit. For this reason, the gate width of the FET Q12 is set to be a value wherein an output impedance is 25 Ω or less. Thus, a load impedance of the FET Q12 also becomes high, and the impedance $R_L$ in the above equation (3) becomes high. As a result, a voltage gain A of the FET Q12 becomes almost 1. Therefore, a voltage gain of each source-follower circuit becomes almost 1. Moreover, since a load impedance of each source-follower circuit is high, an amplitude of a signal input to each source-follower circuit becomes small.

As described above, the source-gate voltages $V_{gs}$ of the FETs Q11 and Q12 become 0 V, and amplitudes of signals supplied to the gates become small. According to the circuit in this embodiment, therefore, a reception signal can be demodulated with excellent linearity. This can be explained as follows.

Figure 5:
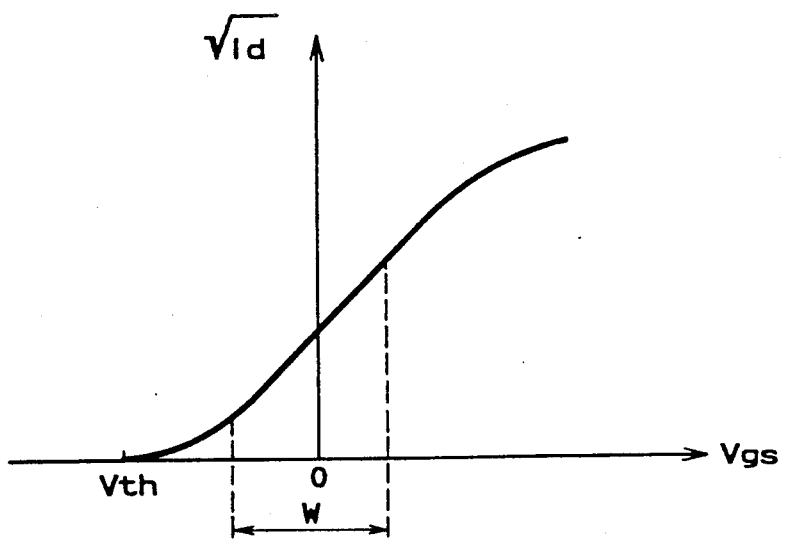
FIG. 5 is a graph showing the relationship between a drain current $(I_d)^{\frac{1}{2}}$ of an FET and a gate-source voltage $V_{gs}$.

In general, a gate-source voltage $V_{gs}$ and drain current $I_d$ have a relationship shown by quadratic equation (1) $(I_d = K(V_{gs} - V_{th})^2)$. The relationship between $(I_d)^{\frac{1}{2}}$ and $V_{gs}$ is therefore represented by a linear equation, and $(I/d)^{\frac{1}{2}}$ changes linearly with a change in $V_{gs}$. In practice, however, the relationship between $(I_d)^{\frac{1}{2}}$ and $V_{gs}$ is shown in FIG. 5, and $(I_d)^{\frac{1}{2}}$ does not change linearly in a whole range. It is because that even if the gate-source voltage $V_{gs}$ is decreased, the drain current $I_d$ does not disappear but keeps flowing at about a threshold voltage $V_{th}$ of the FET because of a threshold current. In addition, the voltage $V_{gs}$ does not change linearly in a range of a high voltage $V_{gs}$ since a Schottky forward current caused by Schottky characteristics between the gate and source flows from the gate to the source, and most of the voltage $V_{gs}$ is spent at a gate parasitic resistor $R_g$ and a source parasitic resistor $R_s$. Even if the gate-source voltage $V_{gs}$ becomes high, therefore, the drain current $I_d$ does not increase linearly.

In addition, in order to decrease distortion of a demodulated signal, it is required to use an FET in a range W of a voltage $V_{gs}$ wherein the relationship between $(I_d)^{\frac{1}{2}}$ and $V_{gs}$ changes linearly. According to this embodiment, as described above, the gate-source voltages $V_{gs}$ of FETs Q11 and Q12 are set to be almost 0 V, and the amplitudes of signals supplied to the gates are small. The FETs Q11 and Q12 are therefore used in the voltage range W wherein the relationship between the drain current $(I_d)^{\frac{1}{2}}$ and the gate-source voltage $V_{gs}$ changes linearly, and distortion of a demodulated signal can be sufficiently decreased.

In order to decrease distortion of the demodulated signal, the gate-source voltages $V_{gs}$ of the FETs Q11 and Q12 must be free from manufacturing variations or a fluctuation in power supply voltage $V_{DD}$. The circuit of this embodiment is arranged so as to be free from these factors. This can be explained as follows.

Since the elements of this circuit are formed on the single chip, even if some manufacturing variations occur, the elements have the same variation rate. Considering the relationships between the resistors R13 and R14, and FETs Q11 and Q12, even if an absolute resistance and device parameters of each FET vary, the variation rates are the same. Therefore, under any variation of the parameters, or a fluctuation in power supply voltage $V_{DD}$, the relationship given by following equation is established.

$$r_{13}/r_{14} = G_{W2}/G_{W1} \qquad (4)$$

For this reason, the relationship given by equation (2) showing the resistance $r_{14}$ of the resistor R14 described above is always established independently of effects of the parameters. In addition, in equation (3) showing the voltage gain A described above, the value of the input impedance $R_L$ of the FET Q12 is sufficiently large, so that the voltage gain A is kept at almost 1 independently of other factors given in equation (3). The gate-source voltages of the FETs Q11 and Q12 are therefore stably kept at almost 0 V regardless of the manufacturing variations or the fluctuation in power supply voltage $V_{DD}$. An amplitude of a signal supplied to each gate is also kept small.

As described above, according to this embodiment, a light signal received by the PIN photodiode 11 is demodulated with good linearity, and transmission/reception of analog signals are performed accurately.

A bandwidth of signals received by this circuit is enlarged. It can be explained as follows.

Figure 6:
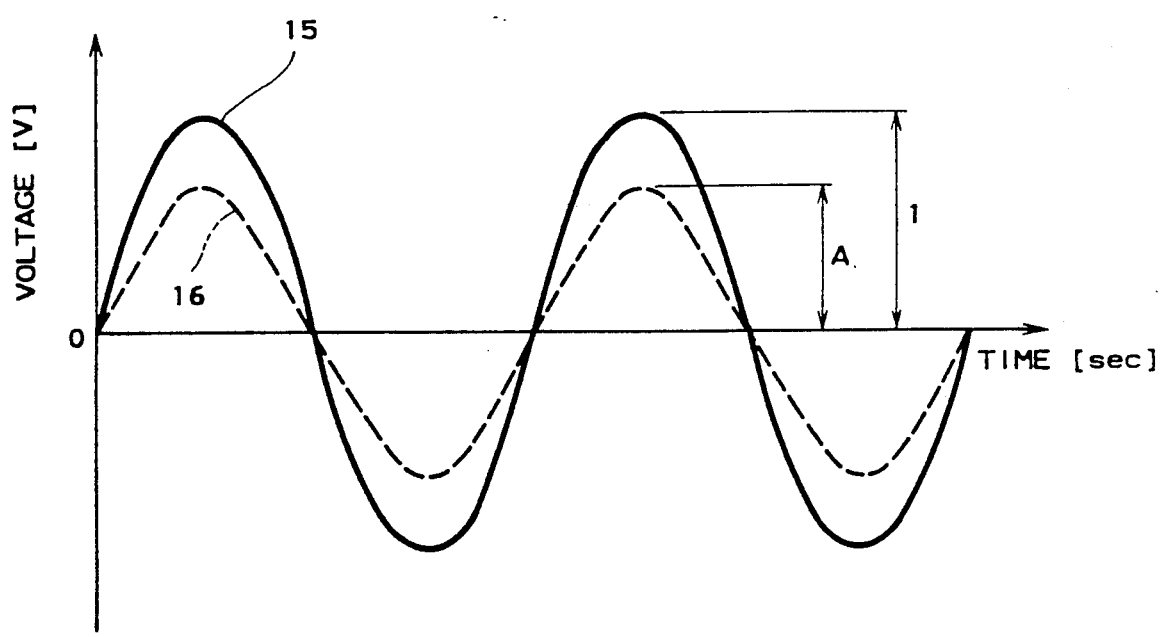
FIG. 6 is a graph for explaining the influence of a voltage gain A on gate and source voltage waveforms of an FET.

When a sine wave voltage is applied to the gate of an FET, the relationship between the gate and source voltages $V_g$ and $V_s$ is shown in FIG. 6. Note that, the axes of ordinate and abscissa represent voltage and time, respectively. A sine waveform represented by a solid line is a gate voltage waveform 15, and a sine waveform represented by a dotted line is a source voltage waveform 16. A ratio of amplitudes of the waveforms is represented by A. When the voltage gain A becomes nearly 1, the amplitude of the source voltage waveform 16 becomes large, and when the voltage gain A becomes 1, two waveforms are matched with each other. In each source-follower circuit of this circuit, the voltage gain A is almost 1, so that the gate and source potentials of the FETs Q11 and Q12 are equal to each other.

As a result, the gate and source voltage waveforms of the FETs Q11 and Q12 change in the same phase, and have almost the same amplitude. Therefore, there are almost no changes in gate-source voltages $V_{gs}$ of the FETs Q11 and Q12. Thus, gate capacitances $C_{gs}$ present between the gates and sources of the FETs Q11 and Q12 can be neglected.

A bandwidth of a signal frequency which can be received by this circuit is in inverse proportion to a time constant defined by the resistor R11 and a capacitance connected in parallel with the resistor R11. This parallel capacitance is represented by the sum of a junction capacitance of the PIN photodiode 11, the gate capacitance $C_{gs}$ of the FET Q11, and a package capacitance of the circuit. As described above, since the gate capacitance $C_{gs}$ can be neglected, the parallel capacitance becomes small to increase the reception bandwidth of this circuit.

Figure 7:
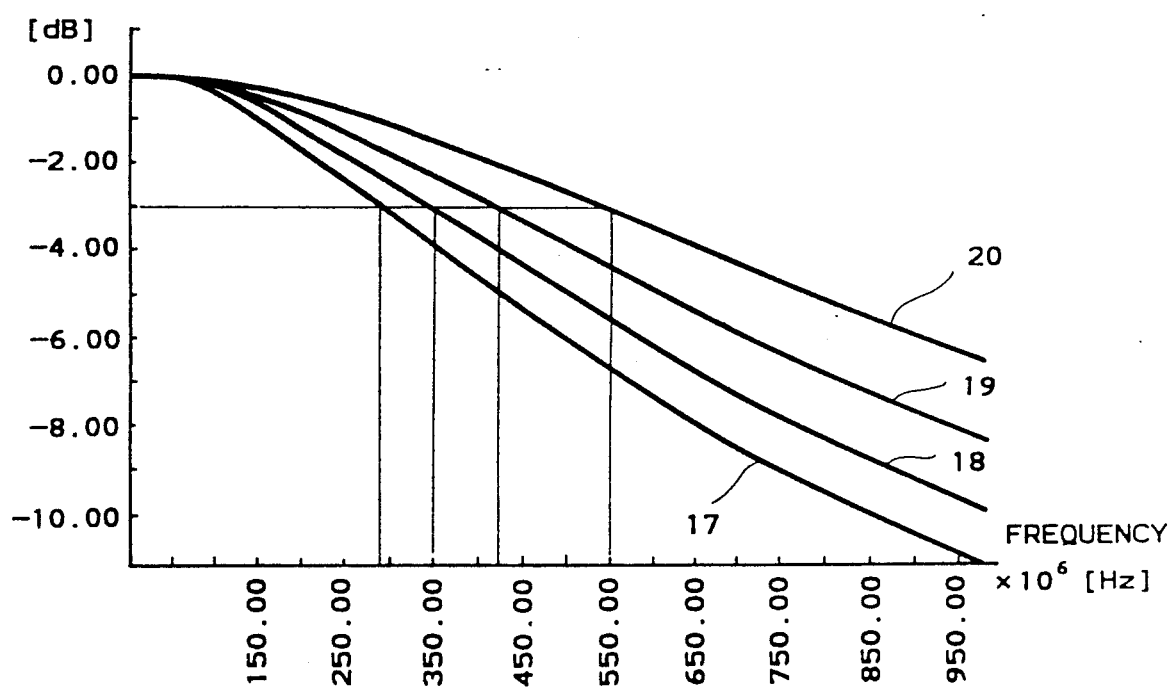
FIG. 7 is a graph showing a change in reception signal band caused by differences in resistance of the resistor R11 and in number of stages constituting source-follower circuits.

FIG. 7 is a graph showing frequency characteristics of a reception signal when the resistance of the resistor R11 and the number of stages consisting of source-follower circuits are changed. The axes of abscissa and ordinate respectively represent a frequency (Hz) and an amount of attenuation (dB) of a signal.

A curve 17 represents frequency characteristics of a reception signal when the light reception circuit has a one-stage source-follower circuit, and a resistance of the resistor R11 is set to be 1 kΩ. Curves 18, 19, and 20 represent frequency characteristics of a reception signal when the light reception circuit has a two-stage source-follower circuit as in this embodiment, and the resistances of the resistors R11 are set to be 1 kΩ, 800 Ω, and 600 Ω, respectively. As can be seen in FIG. 7, when the resistances of the resistors R11 are 1 kΩ each, the two-stage source-follower circuit represented by the curve 18 has a wider frequency bandwidth than the single-stage source-follower circuit. When the circuit has two source-follower circuits, a smaller resistance allows a wider frequency bandwidth. In order to ensure the "desired performance" defined by the law of cable television broadcast, as described above, however, the resistance of the resistor R11 must be 1 kΩ. Taking many conditions into account, therefore, a circuit arrangement having the best frequency characteristics of the reception signals is the circuit arrangement of the embodiment shown in FIG. 3.

Next, in the circuit arrangement of this embodiment, a simulation result of distortion of an output signal obtained by a computer when a sine wave voltage is input instead of the light signal will be described below.

In the circuit arrangement of FIG. 3, a sine wave voltage of 100 MHz is input to the gate of the FET Q11, and an output voltage waveform at the terminal 12 is transformed by Fourier transformation. Three calculation conditions are assumed. As calculation condition (A), the gate width of the last FET Q12 is set to be 260 μm and the load resistance is set to be 18 Ω. As calculation condition (B), the gate width of the last FET Q12 is set to be 260 μm and the load resistance is set to be 75 Ω. As calculation condition (C), the gate width of the last FET Q12 is set to be 500 μm and the load resistance is set to be 75 Ω. When an input power of the sine wave voltage of 100 MHz is set to be 0, −10, or −20 dBm, the values of distortion of the second harmonic component (200 MHz) and the third harmonic component (300 MHz) are shown in Table 1.

Note that, the calculation is performed by approximation of the relationship between the drain-source voltage $V_{ds}$ and the drain current $I_d$ by using some functions, so that the calculation result includes a constant error. The calculation result therefore must be estimated not as an absolute value but as a relative value.

TABLE 1

| CALCULATION CONDITION | POWER | SECOND HARMONIC COMPONENT | THIRD HARMONIC COMPONENT |
|---|---|---|---|
| (A) | −20 | −54 | −62 |
|  | −10 | −40 | −60 |
|  | 0 | −17 | −28 |
| (B) | −20 | −73 | −88 |
|  | −10 | −55 | −84 |
|  | 0 | −34 | −51 |
| (C) | −20 | −81 | −92 |
|  | −10 | −65 | −91 |
|  | 0 | −45 | −65 |

When the gate width of the FET Q12 is 260 μm, the output impedance of the circuit is 18 Ω. When a load of 18 Ω is applied to the circuit, as is understood from calculation condition (A) of Table 1, distortion is considerably large in response to the input power of 0 dBm. When the gate width is 260 μm and the load of 75 Ω is applied, as is seen in calculation condition (B) of Table 1, distortion can be considerably decreased. When the load of same 75 Ω is applied and the gate width is increased to be 500 μm, i.e., the output impedance is decreased, as is understood from calculation condition (C) of Table 1, distortion can be further decreased.

Figure 8:
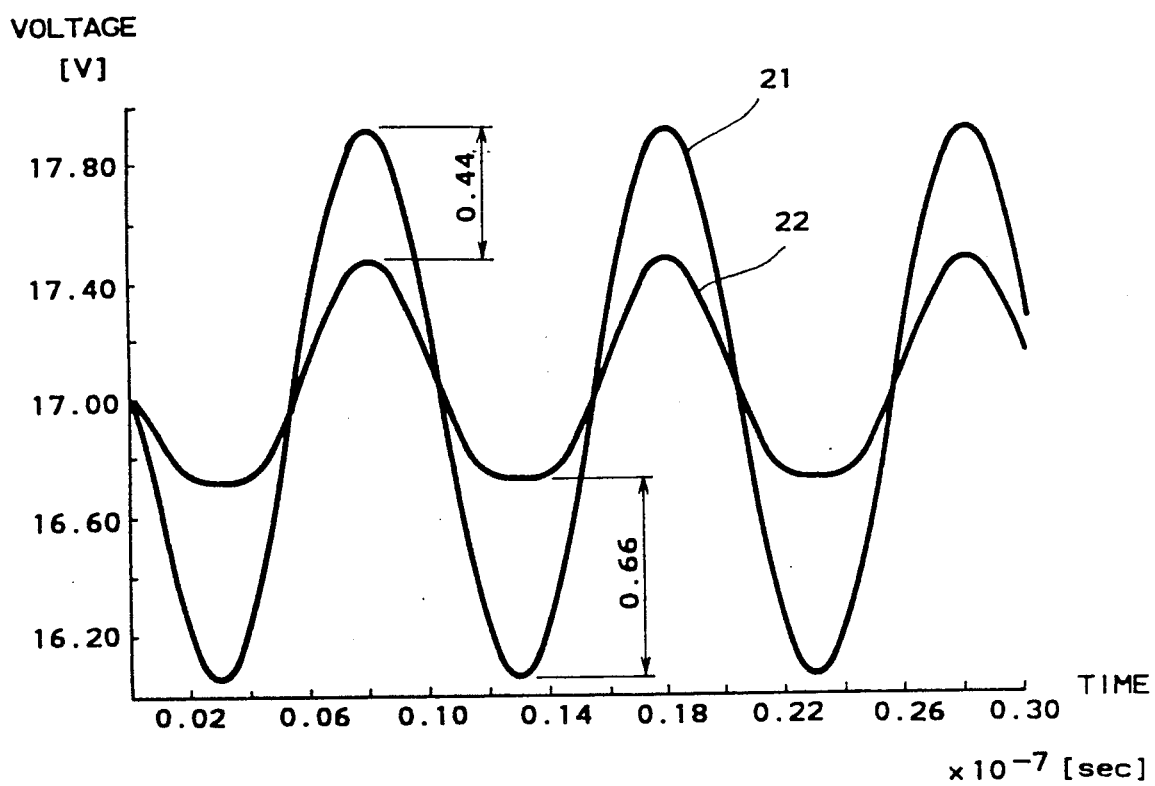
FIG. 8 is graph showing the relationship between gate and source voltage waveforms 21 and 22 of an FET Q12 as computer simulation results when a calculation condition (A) is set.
Figure 9:
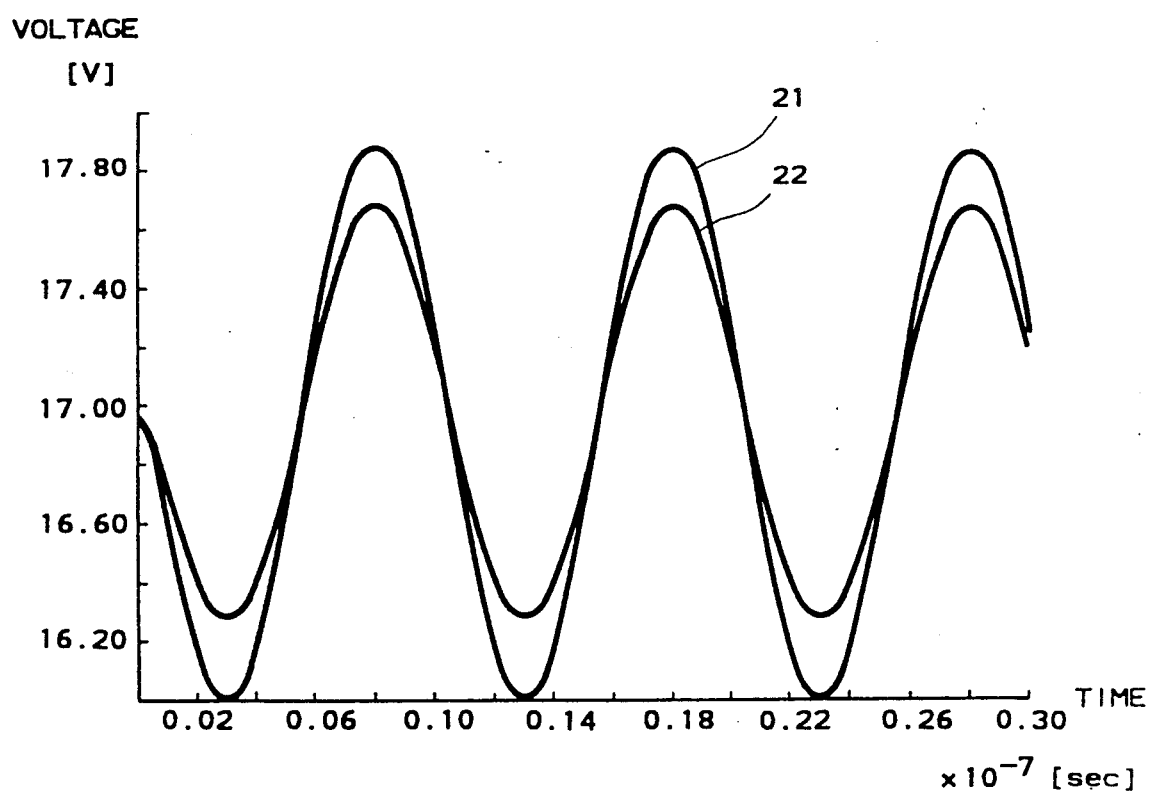
FIG. 9 is a graph showing the relationship between the gate and source voltage waveforms 21 and 22 of the FET Q12 as computer simulation results when a calculation condition (B) is set.
Figure 10:
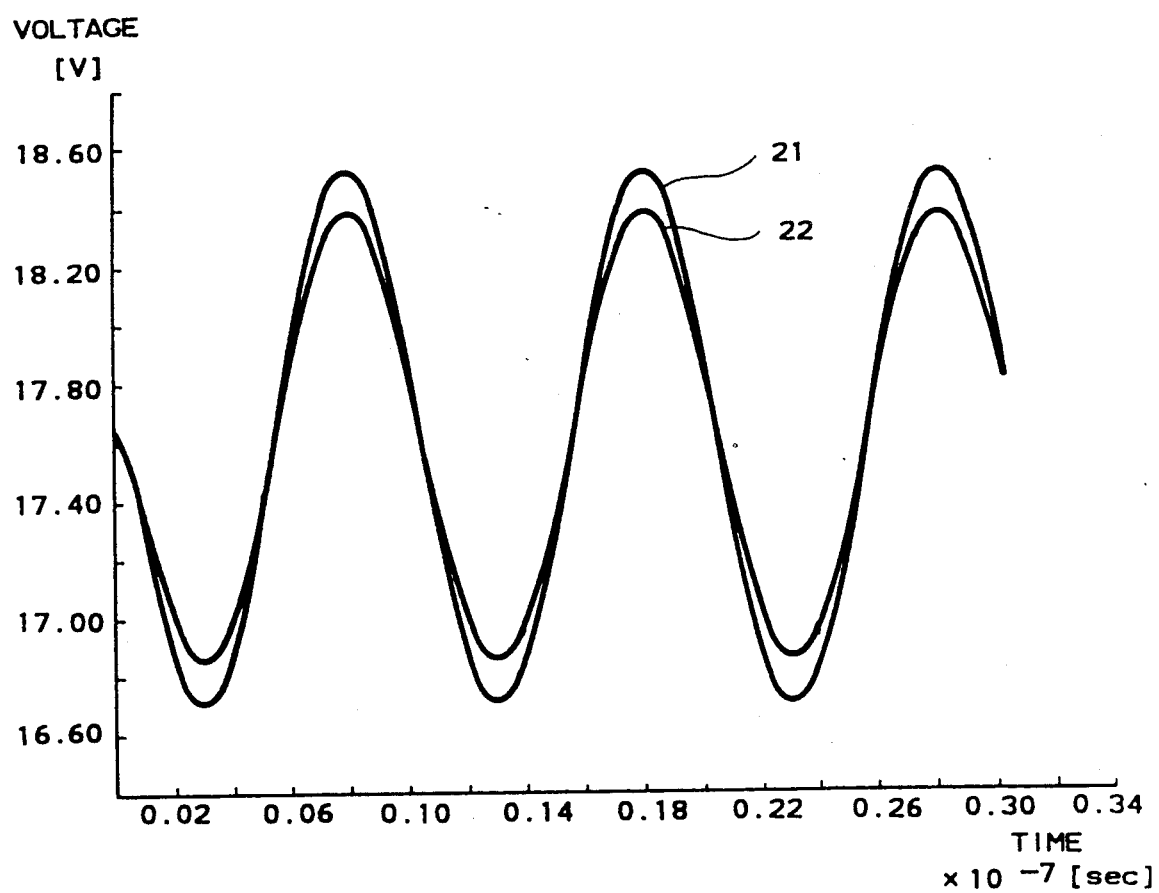
FIG. 10 is a graph showing the relationship between the gate and source voltage waveforms 21 and 22 of the FET Q12 as computer simulation results when a calculation condition (C) is set.

When each input power is set to be 0 dBm in calculation conditions (A), (B), and (C), the gate and source voltage waveforms of the FET Q12 are as shown in FIGS. 8, 9, and 10. The axes of abscissa and ordinate of FIGS. 8 to 10 represent time (sec) and voltages (V), respectively. The waveforms 21 and 22 represent gate and source voltage waveforms, respectively. In FIG. 8, the forward bias of the FET Q12 becomes a maximum of 0.44 V, and the reverse bias of the FET Q12 becomes a maximum of 0.66 V. These voltages are factors for generating distortion in an output signal. As can be understood from FIGS. 8 to 10, when the gate width of the FET Q12 becomes large, i.e., the output impedance becomes low, and the load impedance becomes high, the amplitudes of the waveforms 21 and 22 become similar to each other, and linearity of the output signal is improved.

Figure 11:
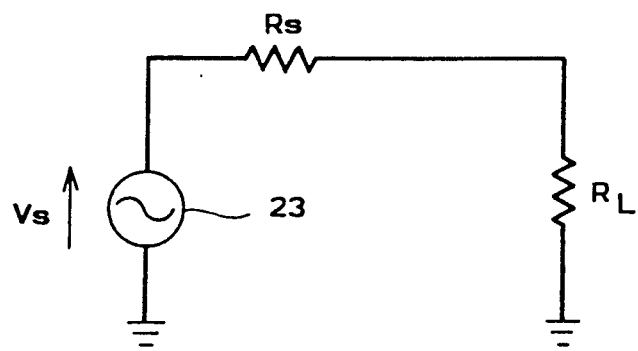
FIG. 11 is a circuit diagram for explaining the amplitude of a signal output from the source of an FET.

This can be explained as follows using a circuit shown in FIG. 11. A signal source 23 generates a voltage $V_S$, and a signal source impedance and a load impedance are represented by resistors $R_S$ and $R_L$, respectively. In this case, when the signal source impedance $R_S$ is equal to the load impedance $R_L$ ($R_S = R_L$), a signal having an amplitude of $V_S/2$ which is half of the voltages $V_S$ is generated across the resistor $R_L$. When this is applied to the FET Q12 of this circuit, it can be explained as follows. That is, when it is assumed that the load impedance connected to the terminal 12 is equal to the output impedance of the FET Q12, since the voltage gain of the FET Q12 is almost 1, the amplitude of the gate voltage signal is about twice as large as the amplitude of an output amplitude, i.e., an amplitude of a source voltage signal. Therefore, judging from this, it can be understood that when an output impedance of an FET is low and a load impedance of the FET is high, amplitudes of voltage waveforms 21 and 22 become similar to each other.

Figure 12:
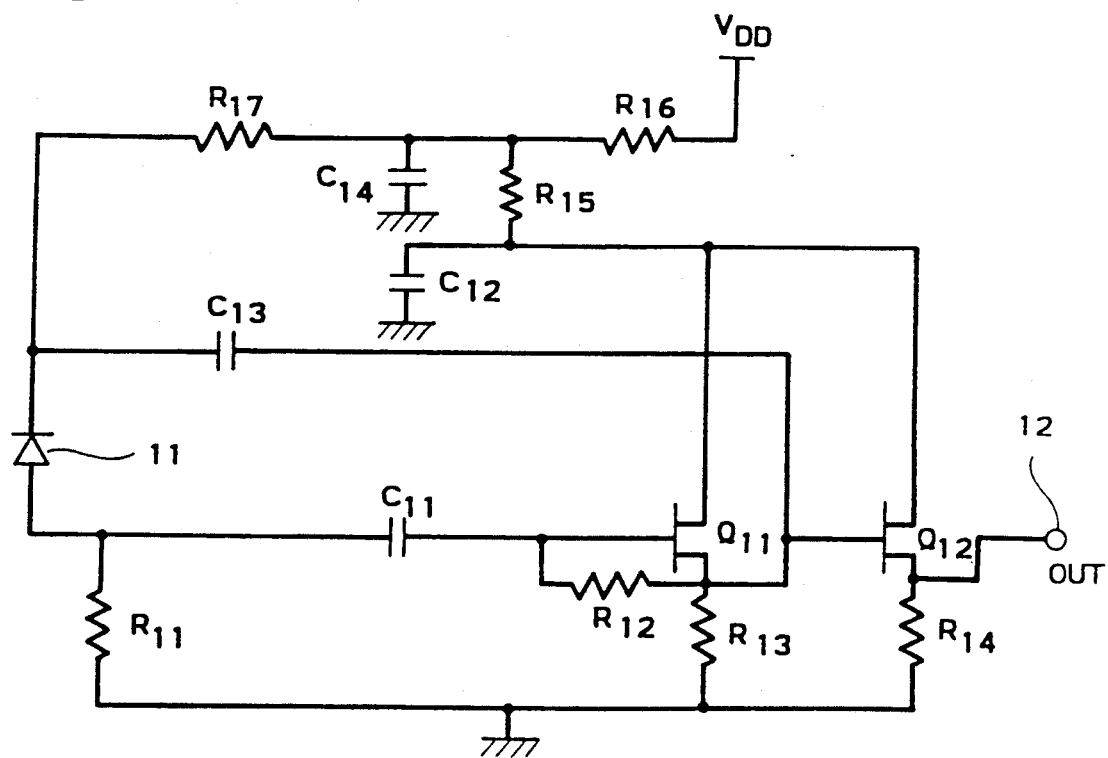
FIG. 12 is a circuit diagram showing an arrangement of another embodiment of the present invention.

FIG. 12 is a circuit diagram showing an arrangement of another embodiment of the present invention. The same reference numerals as in FIG. 3 denote the same parts in FIG. 12 and a description thereof is omitted.

This circuit further comprises a bootstrap circuit so that a bandwidth of a reception signal can be enlarged by positive feedback. More specifically, the anode potential of a PIN photodiode 11 is transferred from the gate of an FET Q11 to this source, and returned to the cathode of the PIN photodiode 11 through a capacitor C13 by positive feedback. Therefore, a voltage between terminals of the PIN photodiode 11 is kept constant, so that no voltage fluctuation between the terminals occurs. Therefore, a junction capacitance of the PIN photodiode 11 becomes small and the reception range of the PIN photodiode 11 can be widened. Note that, resistors R15, R16, and R17 serve to divide a power supply voltage $V_{DD}$ for each element, and a capacitor C14 is a bypass capacitor.

In this embodiment, linearity of a demodulated signal obtained at a terminal 12 is kept excellent, and the same effect as in the above embodiment can be obtained.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

I claim:

1. A demodulation circuit comprising
   a plurality of source-follower circuits, formed on a single semiconductor substrate, for impedance-converting a reception signal,
   wherein a field effect transistor constituting a first source-follower circuit receives the reception signal at a gate thereof, a resistor having a high resistance is connected between the gate and a source, and a resistor is connected to the source,
   a gate of a field effect transistor constituting each of second and subsequent source-follower circuits connected to said first source-follower circuit is connected to the source of the field effect transistor constituting the immediately preceding source-follower circuit, and a source thereof is connected to the gate of the field effect transistor constituting the next source-follower circuit and to a resistor, a product of a gate width of the field effect transistor constituting each of the second and subsequent source-follower circuits and a resistance of the resistor connected to the source thereof is set to be equal to a product of a gate width of the field effect transistor constituting the first source-follower circuit and a resistance of the resistor connected to the source thereof, and
   the gate width of the field effect transistor constituting a last source-follower circuit is set so that an output impedance becomes smaller than an impedance of a load circuit connected to the last source-follower circuit.

2. A demodulation circuit according to claim 1, further comprising a reception circuit comprising a light-receiving element for receiving a light signal and converting the light signal into an electrical signal, a resistor connected in series with said light-receiving element, and a capacitor, one terminal of which is connected to a node between said resistor and said light-receiving element, and the other terminal of which is connected to the gate of the field effect transistor constituting the first source-follower circuit.

3. A demodulation circuit according to claim 2, further comprising a bootstrap circuit for positively feeding back terminal voltage at one terminal of said light-receiving element to the other terminal.

4. A demodulation circuit according to claim 2, wherein a resistance of said resistor connected in series with said light-receiving element is set to be about 1 k$\Omega$.

5. A demodulation circuit according to claim 3, wherein a resistance of said resistor connected in series with said light-receiving element is set to be about 1 k$\Omega$.

6. A demodulation circuit according to claim 2, wherein a capacitance of said capacitor connected to the gate of the field effect transistor constituting the first source-follower circuit is set to be not less than 30 pF.

7. A demodulation circuit according to claim 3, wherein a capacitance of said capacitor connected to the gate of the field effect transistor constituting the first source-follower circuit is set to be not less than 30 pF.

8. A demodulation circuit according to claim 2, wherein said light-receiving element comprises a PIN photodiode.

9. A demodulation circuit according to claim 3, wherein said light-receiving element comprises a PIN photodiode.

10. A demodulation circuit according to claim 4, wherein said light-receiving element comprises a PIN photodiode.

11. A demodulation circuit according to claim 5, wherein said light-receiving element comprises a PIN photodiode.

12. A demodulation circuit according to claim 6, wherein said light-receiving element comprises a PIN photodiode.

13. A demodulation circuit according to claim 7, wherein said light-receiving element comprises a PIN photodiode.

* * * * *